United States Patent
Togashi et al.

(10) Patent No.: US 7,658,260 B2
(45) Date of Patent: Feb. 9, 2010

(54) APPARATUS AND METHOD FOR REDUCING TORQUE STEERING

(75) Inventors: Hiroyuki Togashi, Hachioji (JP);
Hiroshi Mimura, Machida (JP);
Yoshihiro Yonemochi, Yokohama (JP);
Keisuke Oota, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 589 days.

(21) Appl. No.: 10/581,592

(22) PCT Filed: Nov. 17, 2005

(86) PCT No.: PCT/IB2005/003444

§ 371 (c)(1),
(2), (4) Date: Jun. 5, 2006

(87) PCT Pub. No.: WO2006/054155

PCT Pub. Date: May 26, 2006

(65) Prior Publication Data

US 2007/0102225 A1     May 10, 2007

(30) Foreign Application Priority Data

Nov. 18, 2004   (JP)   ............................. 2004-335043

(51) Int. Cl.
*B60G 7/00* (2006.01)
*B60G 17/016* (2006.01)
*B60K 17/00* (2006.01)

(52) U.S. Cl. ................... 180/338; 180/376; 280/5.52
(58) Field of Classification Search ............... 180/252, 180/338, 348, 376; 280/5.513, 5.52
See application file for complete search history.

(56) References Cited

U.S. PATENT DOCUMENTS

2004/0167694 A1   8/2004   Tamai

FOREIGN PATENT DOCUMENTS

JP   2005-229359   9/1993
JP   2004-009843   1/2004

*Primary Examiner*—Lesley Morris
*Assistant Examiner*—Marc A Scharich
(74) *Attorney, Agent, or Firm*—Young Basile

(57) ABSTRACT

An apparatus is provided for suppressing torque steering in a vehicle in which left/right drive shafts are coupled via outer joints to left/right front wheels. The drive shafts are connected via inner joints to an engine and transmission. The height of the inner joints is set 5-20 mm lower than the height of the outer joints, thus forming tilt angles between the left/right drive shafts and the center axis through the left/right wheels and the outer joint. As acceleration of the vehicle increases, the engine moves upward, thus causing the inner joints to move as well. This upward movement of the inner joints causes the tilt angle formed by the drive shafts to decrease. The specific placement of the inner joints is selected so that the left/right tilt angles reach zero at a predetermined rate of acceleration, which may be the vehicle's maximum rate of acceleration.

13 Claims, 3 Drawing Sheets

APPARATUS AND METHOD FOR REDUCING TORQUE STEERING

BACKGROUND

The present invention pertains to the technical field of steering systems for vehicles, and in particular to techniques for reducing torque steering in a vehicle.

In recent years, as engine performance has improved, the output torque of the engine has also increased. When the output torque of the engine increases, even a small difference between the left/right tilt angles can lead to a significant difference between the left/right driving torques, so that torque steering takes place.

Japanese Kokai Patent Application No. 2004-9843 shows a torque steering suppressing structure of a vehicle. On the side of the left/right wheel with a longer distance from the differential gear, an intermediate shaft connected to the differential gear and the drive shaft is set so that the tilt angles (namely, joint bending angles) of the left/right drive shafts are the same, and the lengths of the left/right drive shafts are also equal. To obtain the same tilt angle for the left/right drive shafts, it may be necessary to use support bracket to fix the intermediate shaft, and these may protrude significantly outward from the vehicle lateral direction center.

Japanese Kokai Patent Application No. Hei 9 [1997]-207802 shows a technology for reducing the torque steering by driving an electric motor to cancel the torque steering in a vehicle carrying an electric power-assisting steering system. This technology may require additional components such as an electric motor. There may be waste in output upon starting. Also, when generation of torque steering takes place in large vehicles carrying high power engines, an electric power steering system, which has a smaller assisting force than that of a hydraulic power steering system, may be difficult to adapt to this application.

SUMMARY

It would be desirable to use mechanical means (such as, for example, movement of the engine) to reduce torque steering during acceleration.

In accordance with one aspect of the present invention, an apparatus for suppressing torque steering is provided for use in a vehicle having left and right wheels, a left drive shaft coupled to the left wheel via a left outer joint and a right drive shaft coupled to the right wheel via a right outer joint. The apparatus includes a driving source adapted to accelerate the vehicle up to a predetermined rate of acceleration. As the driving source accelerates the vehicle, the driving source moves from a first position (when the vehicle is at rest) to a second position (when the vehicle has attained the predetermined rate of acceleration). The apparatus also includes a structure that connects the driving source to the left drive shaft and the right drive shaft. The structure is positioned relative to the left and right wheel so that the left and right drive shafts each define a first tilt angle when the driving source is in the first position (when the vehicle is at rest), and a second tilt angle that is smaller than the first tilt angle when the driving source is in the second position. Thus, as the driving apparatus accelerates the vehicle, it moves the drive shafts to reduce the tilt angle and reduce torque steering.

In accordance with another aspect of the invention, a method is provided for suppressing torque steering in a vehicle having a driving source, left and right wheels, a left drive shaft coupled to the left wheel via a left outer joint to define a left tilt angle, and a right drive shaft coupled to the right wheel via a right outer joint to define a right tilt angle. The method includes: coupling the left and right drive shafts to the driving source via left and right inner joints; positioning the left and right inner joints below the left and right outer joints, so that the left and right drive shafts define left and right tilt angles, respectively, with the left and right outer joints; and when the vehicle is accelerating, allowing the left and right inner joints to move upward with the driving source to decrease the left and right tilt angles.

DETAILED DESCRIPTION

When the drive shafts in a vehicle are tilted, vector elements of the drive torque are created around the Z axis. Because the drive shafts provided on the right and on the left show different levels of rigidity when the layout of the power train device is horizontally asymmetrical, different drive torques are generated around the Z axis at the right and left wheels, resulting in torque steering. In the embodiments of the invention described below, the tilt angles are reduced when the vehicle is accelerated so that the torque steering can be restrained.

FIRST EMBODIMENT

Figure 1:
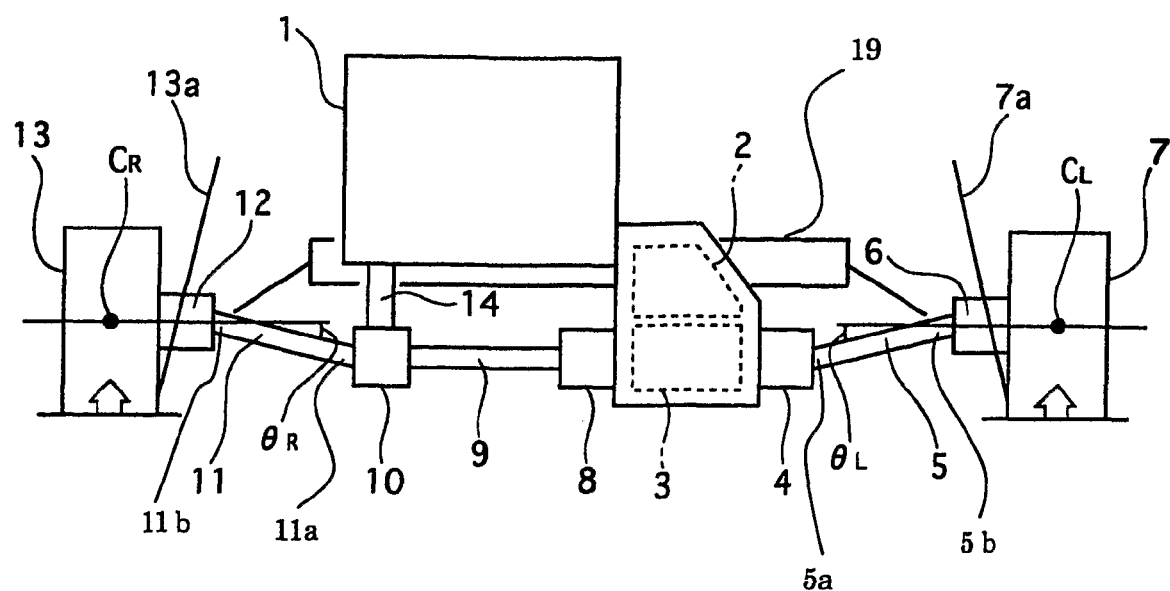
FIG. 1 is a front view of an apparatus for suppressing torque steering in a vehicle, in accordance with a first embodiment of the invention.
Figure 2:
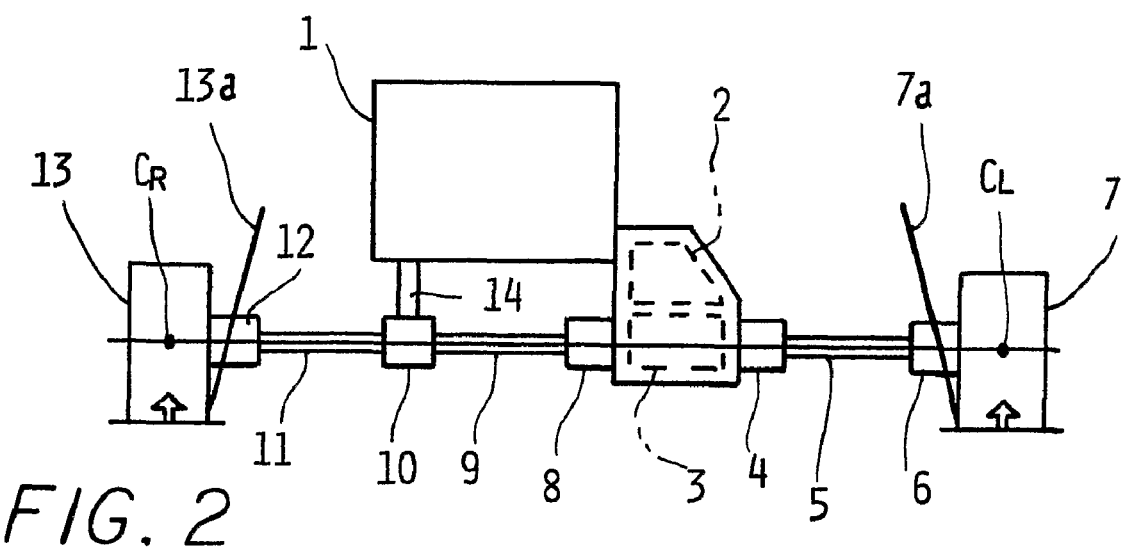
FIG. 2 is a front view of the apparatus of FIG. 1, illustrating the vehicle tilt angle at maximum acceleration.
Figure 3:
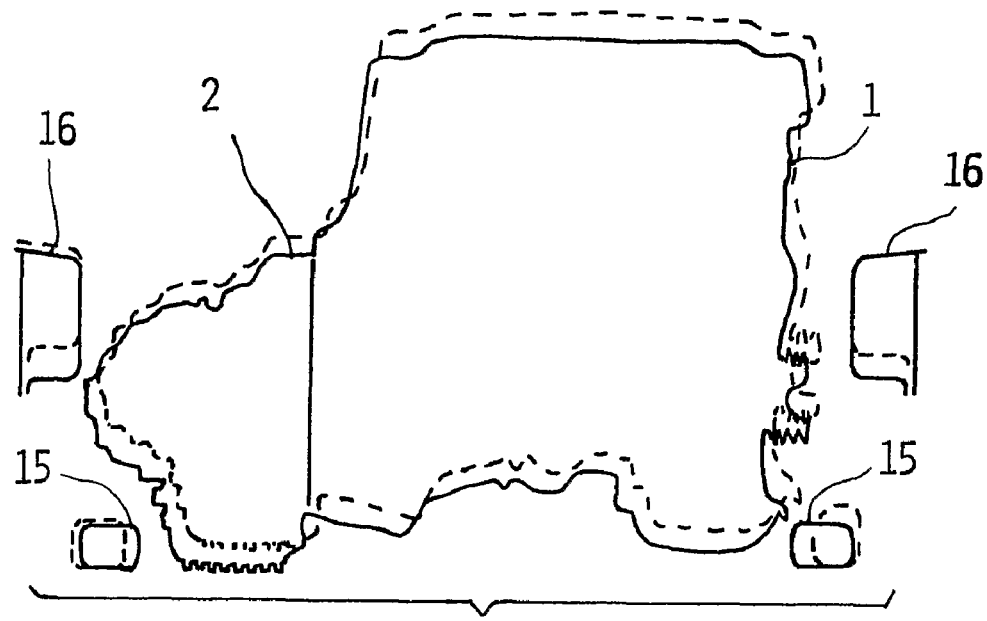
FIG. 3 is a front view of the apparatus of FIG. 1, illustrating the layout of suspension members and vehicle body side members with respect to the engine center.

Referring to FIGS. 1-3, an apparatus is provided for suppressing torque steering in a vehicle.

As shown in FIG. 1, a vehicle includes engine 1, transmission (changing gear) 2, differential gear (differential unit) 3, an inner joint (joint of the drive shaft on the differential gear side) 4, a left drive shaft (drive shaft) 5, an outer joint (joint of the drive shaft on the wheel side) 6, a left-front wheel 7, a kingpin central axis of the left-front wheel 7a, a constant-velocity universal joint 8, an extension shaft (intermediate shaft) 9, an inner joint (joint of the drive shaft on the differential gear side) 10, a right drive shaft 11, an outer joint (joint of the drive shaft on the wheel side) 12, a right-front wheel 13, a kingpin central axis of the right-front wheel 13a, a support bracket 14 and a steering device 19.

Engine 1 is carried on the front portion of the body of the vehicle. The crankshaft of engine 1 extends in the lateral direction of the vehicle, that is, it is a so-called laterally set engine. Differential gear 3 is connected via transmission 2 to the left side of engine 1. Engine 1 and transmission 2 correspond to the driving source. Engine 1 is lowered in relation to a standard configuration, described below, so that the left/right inner joints 4, 10 are approximately 15 mm lower than the position of the left/right outer joints 6, 12.

Differential gear 3 is offset to the left from the center in the lateral direction of the vehicle. One side (the left side) of the differential gear 3 is connected via inner joint 4 as a constant velocity universal joint to connection part 5a of left drive shaft 5. Left front wheel 7 is connected to connection part 5b of left drive shaft 5 via outer joint 6 as a constant velocity universal joint.

The other side (right side) of differential gear 3 is connected to intermediate shaft 9 extending in the lateral direction of the vehicle via constant velocity universal joint 8 by means of a spline fitting. The intermediate shaft 9 is connected via inner joint 10 as a constant velocity universal joint to connection part 11a of right drive shaft 11. Right front wheel 13 is connected to connection part 11b of drive shaft 11 via outer joint 12 as a constant velocity universal joint. Also, intermediate shaft 9 is supported on engine 1 via support bracket 14. The tilt angle is defined as the angle ($\theta_L$, $\theta_R$) between the drive shaft and the axis (CL, CR) that connects the center of a respective wheel and the joint of the drive shaft on the wheel side. The axes CL and CR correspond to the line that connects the center of the left wheel and the center of the right wheel.

In the first embodiment, if the lines connecting wheel centers CL, CR and left/right outer joints 6, 12 and left/right drive shafts 5, 11 form left/right tilt (or knuckle) angles $\theta_L$ and $\theta_R$, then, as the acceleration of the vehicle is increased, the left/right tilt angles $\theta_L$ and $\theta_R$ both decrease. In addition, as shown in FIG. 2, when the acceleration of the vehicle reaches a maximum, both left/right tilt angles $\theta_L$, $\theta_R$ become zero. Lengths $L_L$, $L_R$ of the left/right drive shafts 5, 11 are equal, and the initial values (the values when the driver and passengers get in/out the vehicle) of left/right tilt angles $\theta_L$, $\theta_R$ are equal.

As shown in FIG. 3, the engine center (position where the engine is mounted) is set lower by 15 mm from its conventional position, so that the height of left/right inner joints 4, 10 (connection parts 5a, 11a) is set lower by 15 mm than the positions of left/right outer joints 6, 12 (connection parts 5b, 11b).

In addition, corresponding to lowering of the engine center, the height of the upper surface position of suspension members 15 that support left/right front wheels 7, 13 is also 15 mm lower than a standard position, described below, as indicated by the wave lines in FIG. 3, and at the same time, the vehicle body side members 16 positioned above engine 1 are 15 mm thicker in the vertical direction.

Mechanism of Generation of Secondary Force Moment

In a conventional front wheel drive car, if the angle of the kingpin central axis with respect to the wheel is $\alpha$, the tilt angle of the drive shaft is $\theta$, and the output torque of the engine is T, secondary force moment $T_S$ on the periphery of the kingpin is given by following formula (1).

$$T_S = T \tan\theta \times \cos\alpha = T \tan\theta \because \cos\alpha \approx 1 \quad (1)$$

That is, the secondary force moment generated on the periphery of the kingpin is equal to a value obtained by multiplying tan $\theta$ by output torque T of the engine.

Effect in Suppressing Secondary Force Moment Corresponding to Acceleration

When tilt angle $\theta_L$ of the left drive shaft and tilt angle $\theta_R$ of the right drive shaft are set equal, and length $L_L$ of the left drive shaft and length $L_R$ of the right drive shaft are set equal, when the vehicle accelerates, $T_L > T_R$, and a torque steering due to left/right difference $\Delta T$ of the secondary force moment represented by following formula (2) is generated.

$$\Delta T = T_L \tan\theta_L - T_R \tan\theta_R \quad (2)$$

Here, if the left/right tilt angles $\theta_L$ and $\theta_R$ are both $\theta$, in order for the secondary force moment $T_L$, $T_R$ generated in left/right drive shafts 5, 11 to be nearly zero, one may control tilt angle $\theta$ such that $\theta \approx 0$ when the vehicle is accelerated.

Figure 4:
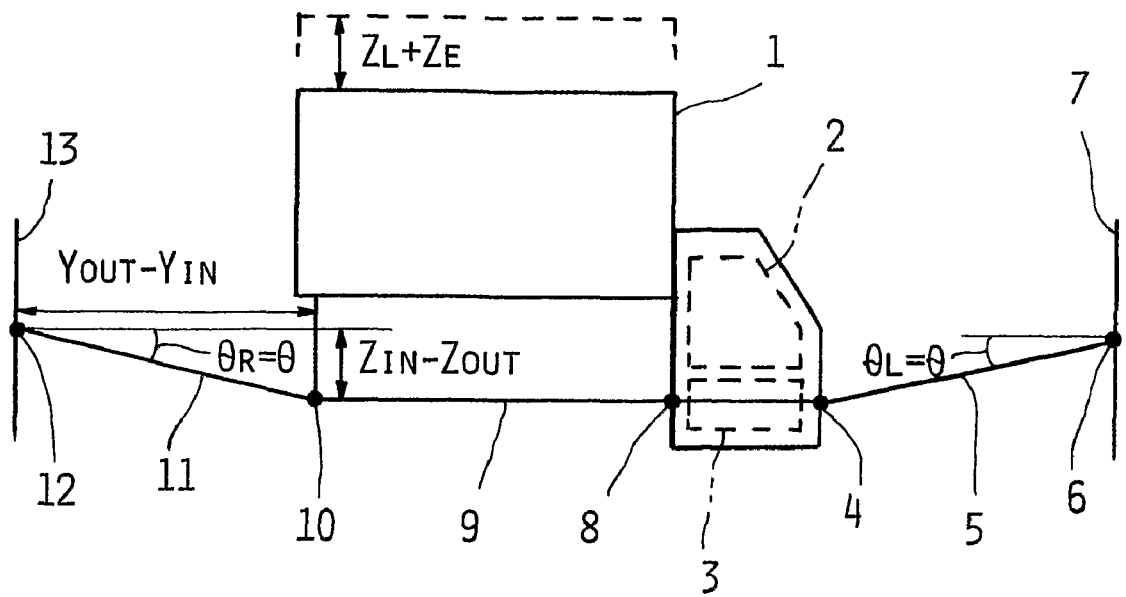
FIG. 4 is a schematic representation of the apparatus of FIG. 1, illustrating the method for computing the height of the inner joints and outer joints.

In the first embodiment of the invention, as shown in FIG. 4, if:

$Z_{in}$: height of left/right inner joints 4, 10;

$Z_{out}$: height of left/right outer joints 6, 12;

$Z_L$: lift distance of the vehicle body front portion when the engine drives;

$Z_E$: upper/lower rocking distance of engine 1;

$Y_{out}$: positions of left/right outer joints 6, 12 in the vehicle lateral direction;

$Y_{in}$: positions of left/right inner joints 4, 10 in the vehicle lateral direction;

then tilt angle $\theta$ is represented by following formula (3), in which $Z_{in}$, $Z_{out}$, $Y_{out}$, $Y_{in}$ are the initial values (when the driver and passengers get in/out the vehicle).

$$\theta = a\tan(Z_{in} - Z_{out} + Z_L + Z_E)/(Y_{out} - Y_{in}) \quad (3)$$

By the control, $Z_{in}$ and $Z_{out}$ are set so that $\theta \approx 0$ at the highest acceleration when the torque steering is the largest.

For example, for large vehicles, when the weight is in the range of 1,400-1,600 kg, the maximum acceleration is in the range of 0.5-0.6 G, and the friction coefficient of the tires is in the range of 1.05-1.10, then from each average value one can determine lift distance $Z_L$ and rocking distance $Z_E$ of engine 1 to be $Z_L \approx 25$ mm and $Z_E \approx 10$ mm. Consequently, by setting $Z_{in} - Z_{out}$ smaller than 15 mm, it is possible for tilt angle $\theta$ to be smaller at a higher acceleration, and it is possible to obtain a nearly zero value for tilt angle $\theta$ at maximum acceleration.

Effect of Increase of the Cross-Sectional Area of the Side Member of a Vehicle Body Along with a decrease in the engine center (engine carrying position), if the height of suspension member 15 is set 15 mm lower, the impact performance of the vehicle body degrades, and this is undesirable. In the first embodiment, the cross-sectional area of a vehicle body side member 16 is increased corresponding to the lowering of suspension member 15. Consequently, it is possible to prevent degradation in the collision performance while avoiding interference between suspension member 15 and engine 1 or the auxiliary machinery. One advantage of the present invention is that a vehicle body structure as shown in the first embodiment with a larger cross-sectional area of vehicle body side member 16 may provide a greater reactive force in collision.

In the first embodiment, as the positions of left/right drive shafts 5, 11, left/right inner joints 4, 10 and left/right outer joints 6, 12 are controlled while considering of the change in the tilt angle accompanying engine lift up and engine rocking in acceleration, it is possible to reduce the secondary force moment on the periphery of the kingpin central axis generated in left/right drive shafts 5, 11.

Because the tilt angles are reduced when the vehicle is accelerated, the secondary couples around the central axes of king pins which are generated at the right and left wheels are reduced, so that the torque steering can be restrained.

If the drive shafts are in a configuration so that their inner ends are raised, then the acceleration of the vehicle will cause the engine to rise, thus increasing the tilt angle and torque steering. In contrast, in the foregoing embodiment, the tilt angles are reduced as the vehicle begins to accelerate. More specifically, because the drive shafts are tilted in such a manner that their inner ends are lowered in the width direction of the vehicle, the vehicle is lifted upward in the direction the tilt angles are reduced at least at the time of acceleration. Thus, the torque steering can be reduced.

In addition, even when the tilt angles of the drive shafts for lowering their inner ends in the width direction of the vehicle are so small that their inner ends end up being lifted upward in the width direction of the vehicle due to excessive acceleration, the torque steering can be still restrained in accordance with the invention better than with the conventional design in which the drive shafts are tilted in such a manner that their inner ends in the width direction of the vehicle are up-lifted.

With the torque steering suppressing structure in the first embodiment, the following effects can be realized.

(1) In a vehicle in which left/right drive shafts 5, 11 connected to left/right front wheels 7, 13 are respectively connected to differential gear 3 connected to the driving source (engine 1 and transmission 2), the structure is set such that left/right tilt angles $\theta_L$, $\theta_R$ decrease as the acceleration of the vehicle is increased. Consequently, there is a reduction in the secondary force moment of left/right drive shafts 5, 12 as the acceleration is increased, and the left/right difference in the secondary force moment decreases. As a result, the amount that steering device 19 gets pulled by the right and left front wheels 7 and 13 can be reduced, and torque steering can be reduced as a result.

(2) The structure is set such that when the acceleration reaches a preset acceleration, both left/right tilt angles $\theta_L$, $\theta_R$ become zero. Consequently, it is possible for the secondary force moment of left/right drive shafts 5, 12 to be nearly zero at the preset acceleration, and it is possible to reduce generation of torque steering at the preset acceleration.

(3) The acceleration at which left/right tilt angles $\theta_L$, $\theta_R$ become zero may be taken as the maximum acceleration of the vehicle (0.5-0.6 G). Although the secondary force moment reaches a maximum at the maximum acceleration, since left/right tilt angles $\theta_L$, $\theta_R$ become zero, the secondary force moment also is reduced or absent. Consequently, it is possible to reduce torque steering when the vehicle is started at full throttle.

(4) Differential gear 3 connected to the driving source is set offset from the vehicle lateral direction center, left drive shaft 5 is directly connected via inner joint 4 to differential gear 3, and right drive shaft 11 is connected via extension shaft 9 and inner joint 10 to differential gear 3. Consequently, it is possible to set the initial values of lengths $L_L$ and $L_R$ of left/right drive shafts 5, 11 nearly equal and the initial values of left/right tilt angles $\theta_L$, $\theta_R$ to be nearly equal, and it is possible to have a structure for which torque steering is reduced.

(5) Engine 1 set laterally with the crankshaft extending in the vehicle lateral direction is used as the driving source, and the height of left/right inner joints 4, 10 when the vehicle is stopped is set 15 mm lower than the position of left/right outer joints 6, 12. Consequently, it is possible to have left/right tilt angles $\theta_L$, $\theta_R$ at maximum acceleration to be nearly zero and to reduce generation of torque steering. Also, by lowering the engine center, it is possible to lower the position of left/right inner joints 4, 10, so that there is less degradation in the other suspension characteristics and design properties.

(6) While the height of suspension member 15 positioned below engine 1 is set lower corresponding to the position of left/right inner joints 4, 10, the cross-sectional area of car body side member 16 positioned above suspension member 15 is increased corresponding to the height of suspension member 15. Consequently, the height of suspension member 15 is lowered, and it is possible to suppress degradation in the collision performance of the vehicle body while avoiding interference with engine 1 and the auxiliary machinery of the engine.

SECOND EMBODIMENT

Figure 5:
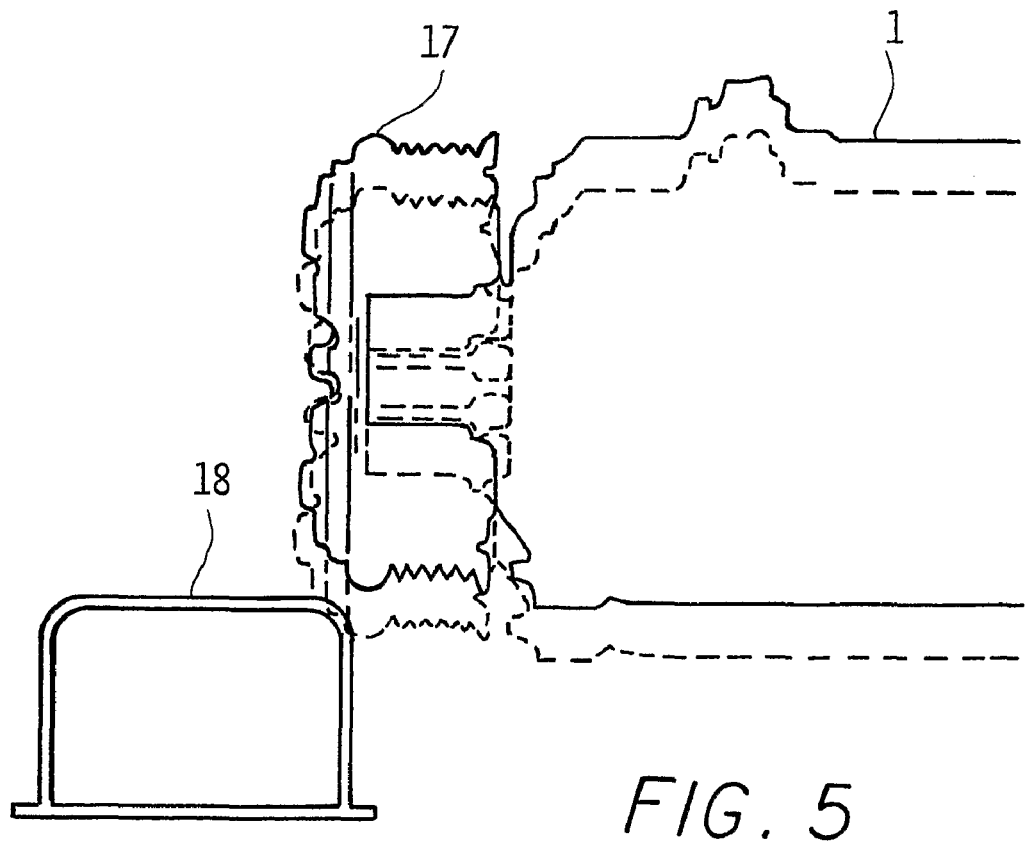
FIG. 5 is a back view of an apparatus for suppressing torque steering in a vehicle, in accordance with a second embodiment of the invention.

In a second embodiment of the invention, as shown in FIG. 5, the position of the auxiliary machinery of engine 1 is set higher than engine 1 corresponding to the positions of left/right inner joints 4, 10.

FIG. 5 is a back view illustrating the torque steering suppressing structure in accordance with a second embodiment of the invention. In this embodiment, when the engine center is set 15 mm lower, the position of air conditioner pulley (auxiliary machinery) 17 is set 15 mm higher with respect to engine 1, so interference with suspension member 18 is avoided.

In the following, an explanation will be given regarding operation.

In the first embodiment of the invention, when the engine center is lowered, the upper surface of the suspension member is lowered so that interference between the two members can be prevented. In this case, it helpful to change the shape of the suspension member and the vehicle body side members positioned below engine 1.

In the second embodiment of the invention, only the position of air conditioner pulley 17 is changed with respect to engine 1, so that it is possible to avoid interference between engine 1 and suspension member 18 without changing the position and shape of suspension member 18 and vehicle body side members as in the prior art.

In the following, an explanation will be given regarding the effects. For the torque steering suppressing structure in the second embodiment, in addition to features and advantages (1)-(5) in the first embodiment, there are the following features and advantages.

(7) Because the position of air conditioner pulley 17 as auxiliary machinery of engine 1 may be set 15 mm higher with respect to engine 1 corresponding to the positions of left/right inner joints 4, 10, it is possible to reduce interference between air conditioner pulley 17 and suspension member 18 without changing the shape of suspension member 18 and the vehicle body side members.

OTHER EMBODIMENTS

The present invention has been explained with reference to the foregoing embodiments. However, the present invention is not limited to the construction described in these embodiments, and modifications of the design are allowed as long as the gist of the present invention is observed.

For example, the types of vehicles for application of the torque steering suppressing structure of a vehicle in the present invention are not limited to vehicles driven by engines and with a transmission as the driving source. It may also be adopted in electric automobiles with a motor and transmission as the driving source as well as hybrid vehicles with an engine and motor as the driving source.

In the first and second embodiment, the height of the inner joint is set 15 mm lower than the height of the outer joint. However, this is merely an example. A distance in the range of 5-20 mm, depending on the characteristics of the vehicle (weight, maximum acceleration, friction coefficient of tires, etc.), may offer beneficial results. Also, in the first and second embodiments, the tilt angle is zero when the vehicle is at maximum acceleration (0.5-0.6 G). However, this is merely an example, and it is also possible to set the height of the inner joint and the outer joint such that the tilt angle reaches zero before the vehicle reaches maximum acceleration. In this case, it is possible that the structure be set such that the tilt angle reaches zero at an acceleration that occurs with high frequency for the vehicle and that corresponds to easy generation of torque steering.

In the first and second embodiments, an explanation was provided for a vehicle in which the driving source moves upward corresponding to acceleration. However, for a vehicle that has the vehicle body mounted such that the driving source moves downward corresponding to acceleration, by setting the initial position of the inner joints higher than the outer joints, it is possible to reduce the drive shaft tilt angle during acceleration.

This application is based on Japanese Patent Application No. 2004-335043, filed Nov. 18, 2004 in the Japanese Patent Office, the entire contents of which are hereby incorporated by reference.

The above-mentioned embodiments have been described in order to allow easy understanding of the present invention. The invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for suppressing torque steering in a vehicle having left and right wheels, a left drive shaft coupled to the left wheel via a left outer joint, a right drive shaft coupled to the right wheel via a right outer joint, comprising:
   a driving source adapted to accelerate the vehicle from an at rest condition to a predetermined rate of acceleration, and adapted to move from a first position when the vehicle is at rest to a second position during the predetermined rate of acceleration; and
   a structure that connects the driving source to the left drive shaft and the right drive shaft, which structure is positioned relative to the left and right wheels so that the left and right drive shafts each define a first tilt angle when the driving source is in the first position, and a second tilt angle that is smaller than the first tilt angle when the driving source is in the second position.

2. The apparatus of claim 1, wherein the structure is positioned relative to the left and right wheels so that the second tilt angle is zero.

3. The apparatus of claim 2, wherein the predetermined rate of acceleration is taken as a highest acceleration of the vehicle.

4. The apparatus of claim 1, wherein the driving source comprises a laterally set engine having a crankshaft extending in a lateral direction of the vehicle; and wherein the structure further comprises:
   a differential gear connected to the driving source, which is offset from the center in the vehicle's width direction;
   a first joint adapted to connect one of the left and right drive shafts to the differential gear;
   an intermediate shaft connected to the differential gear; and
   a second joint adapted to connect the other of the left and right drive shafts to the intermediate shaft.

5. The apparatus of claim 1, wherein the structure further comprises a joint adapted to connect to one of the left and right drive shafts;
   wherein the height of the joint when the vehicle is at rest is lower by a prescribed height than the height of the left and right outer joints.

6. The apparatus of claim 5, wherein the prescribed height is selected in the range of 5-20 mm.

7. The apparatus of claim 5, further comprising auxiliary machinery operatively associated with the driving source, wherein the position of the auxiliary machinery is raised with respect to the engine corresponding to the position of the joint included in the structure.

8. An apparatus for suppressing torque steering in a vehicle having left and right wheels, a left drive shaft coupled to the left wheel via a left outer joint to define a left tilt angle, a right drive shaft coupled to the right wheel via a right outer joint to define a right tilt angle, comprising:
   driving means for accelerating the vehicle; and
   coupling means for mechanically connecting the left and right drive shafts to the driving means so that the left and right tilt angles decrease as acceleration of the vehicle increases.

9. The apparatus of claim 8, wherein the coupling means is adapted to decrease the left and right tilt angles when the acceleration reaches a predetermined rate of acceleration.

10. The apparatus of claim 9, wherein the predetermined rate of acceleration is taken as the a highest acceleration of the vehicle.

11. The apparatus of claim 8, wherein the driving means comprises a laterally set engine having a crankshaft extending in a lateral direction of the vehicle; and wherein the coupling means comprises: a differential gear connected to the driving means, which is offset from the center in the vehicle's width direction; a first joint adapted to connect one of the left and right drive shafts to the differential gear; an intermediate shaft connected to the differential gear; and a second joint adapted to connect the other of the left and right drive shafts to the intermediate shaft.

12. The apparatus of claim 8, wherein the coupling means further comprises an inner joint adapted to connect to one of the left and right drive shafts; wherein the height of the inner joint when the vehicle is at rest is lower by a prescribed height than the height of the left and right outer joints.

13. The apparatus of claim 8, wherein the prescribed height is selected in the range of 5-20 mm.

* * * * *